US012347401B2

(12) United States Patent
Kuo

(10) Patent No.: US 12,347,401 B2
(45) Date of Patent: Jul. 1, 2025

(54) CONTROL DEVICE AND OPERATION METHOD THEREOF AND ELECTRONIC DEVICE

(71) Applicant: Nuvoton Technology Corporation, Hsinchu Science Park (TW)

(72) Inventor: Meng-Huang Kuo, Hsinchu County (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 18/511,057

(22) Filed: Nov. 16, 2023

(65) Prior Publication Data

US 2024/0212640 A1 Jun. 27, 2024

(30) Foreign Application Priority Data

Dec. 21, 2022 (TW) ................................ 111149146

(51) Int. Cl.
*G09G 3/36* (2006.01)

(52) U.S. Cl.
CPC ....... *G09G 3/36* (2013.01); *G09G 2340/0421* (2013.01)

(58) Field of Classification Search
CPC ............. G09G 3/36; G09G 2340/0421; G09G 2340/0407; G09G 2340/0414; G09G 2310/0286
See application file for complete search history.

(56) References Cited

U.S. PATENT DOCUMENTS

2006/0146076 A1 7/2006 Huang et al.
2011/0187755 A1 * 8/2011 Choi ........................ G09G 5/10 345/690
2014/0063069 A1 3/2014 Prabakaran

FOREIGN PATENT DOCUMENTS

JP 07036443 * 2/1995 ............ G09G 5/393
TW 201044869 A1 12/2010
TW 201728153 A 8/2017

OTHER PUBLICATIONS

Office Action dated Dec. 4, 2023, issued in corresponding Taiwan Application No. 111149146, 7 pages.

* cited by examiner

*Primary Examiner* — Matthew A Eason
*Assistant Examiner* — Scott D Au
(74) *Attorney, Agent, or Firm* — Muncy, Geissler, Olds & Lowe, P.C.

(57) ABSTRACT

A control device includes a storage module and a control module. The storage module includes a plurality of registers. The control module sets the buffer width of the registers, the used number of the registers and the occupied number that a horizontal line signal occupies the registers according to the horizontal resolution. The control module receives the horizontal line signal. The control module assigns a plurality of pixels of the horizontal line signal to the registers. The control module sequentially outputs pixels of the horizontal line signal from the registers.

18 Claims, 6 Drawing Sheets

100

CONTROL DEVICE AND OPERATION METHOD THEREOF AND ELECTRONIC DEVICE

CROSS REFERENCE TO RELATED APPLICATIONS

This application claims priority of Taiwan Patent Application No. 111149146, filed on Dec. 21, 2022, the entirety of which is incorporated by reference herein.

BACKGROUND OF THE INVENTION

Field of the Invention

The present invention relates to a control device, and in particular it relates to a control device and an operation method thereof and an electronic device.

Description of the Related Art

In general, control devices (such as micro controllers) are provided with registers, so that the data required by the display device may be temporarily stored and output through the registers. However, since the number of registers and the buffer width of the register are fixed, when the horizontal resolution of the display device is greater than the maximum buffer width of the register, a situation that the control device may not support the display device is occurred, or the bandwidth of the system bus is limited, a situation that the data may not transmitted in a timely manner to occur the error of the image display is occurred. Accordingly, the convenience of use is decreased.

Therefore, how to effectively design a control device has become a focus of technical improvements.

BRIEF SUMMARY OF THE INVENTION

An embodiment of the present invention provides a control device and an operation method thereof, and an electronic device, so that the control device and the electronic device may have a structure in which the number of registers may vary, so as to avoid the situation in which the control device may not support the display device when the horizontal resolution of the display device is greater than the maximum bandwidth of the register, or the situation in which the data may not be transmitted in a timely manner leading to causing errors in the image display when the bandwidth of the system bus is limited, and increase the convenience of use.

An embodiment of the present invention provides a control device, which includes a storage module and a control module. The storage module includes a plurality of registers. The control module is configured to set the buffer width of the registers, the used number of the registers and the occupied number that a horizontal line signal occupies the registers according to the horizontal resolution. The control module receives the horizontal line signal. The control module assigns a plurality of pixels of the horizontal line signal to the registers, and sequentially outputs pixels of the horizontal line signal from the registers.

An embodiment of the present invention provides an operation method of a control device, which includes the following steps. A storage module including a plurality of registers is provided. A control module is used to set the buffer width of the registers, the used number of the registers and the occupied number that a horizontal line signal occupies the registers according to a horizontal resolution, receive the horizontal line signal, assign a plurality of pixels of the horizontal line signal to the registers, and sequentially output pixels of the horizontal line signal from the registers.

An embodiment of the present invention provides an electronic device, which includes a display device and a control device. The control device is coupled to the display device. The control device includes a storage module and a control module. The storage module includes a plurality of registers. The control module is configured to set the buffer width of the registers, the used number of the registers and the occupied number that a horizontal line signal occupies the registers according to the horizontal resolution, receive the horizontal line signal, assign a plurality of pixels of the horizontal line signal to the registers, and sequentially output pixels of the horizontal line signal from the registers.

According to the control device and the operation method thereof, as well as the electronic device disclosed by the present invention, the control module sets the buffer width of the registers of the storage module, the used number of the registers and the occupied number that the horizontal line signal occupies the registers according to the horizontal resolution. The control module receives the horizontal line signal, and assigns the pixels of the horizontal line signal to the registers. Therefore, the control device and the electronic device may have a structure in which the number of registers may vary, so as to avoid the situation in which the control device may not support the display device when the horizontal resolution of the display device is greater than the maximum bandwidth of the register, or the situation in which the data may not be transmitted in a timely manner leading to causing errors in the image display when the bandwidth of the system bus is limited, and increase the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
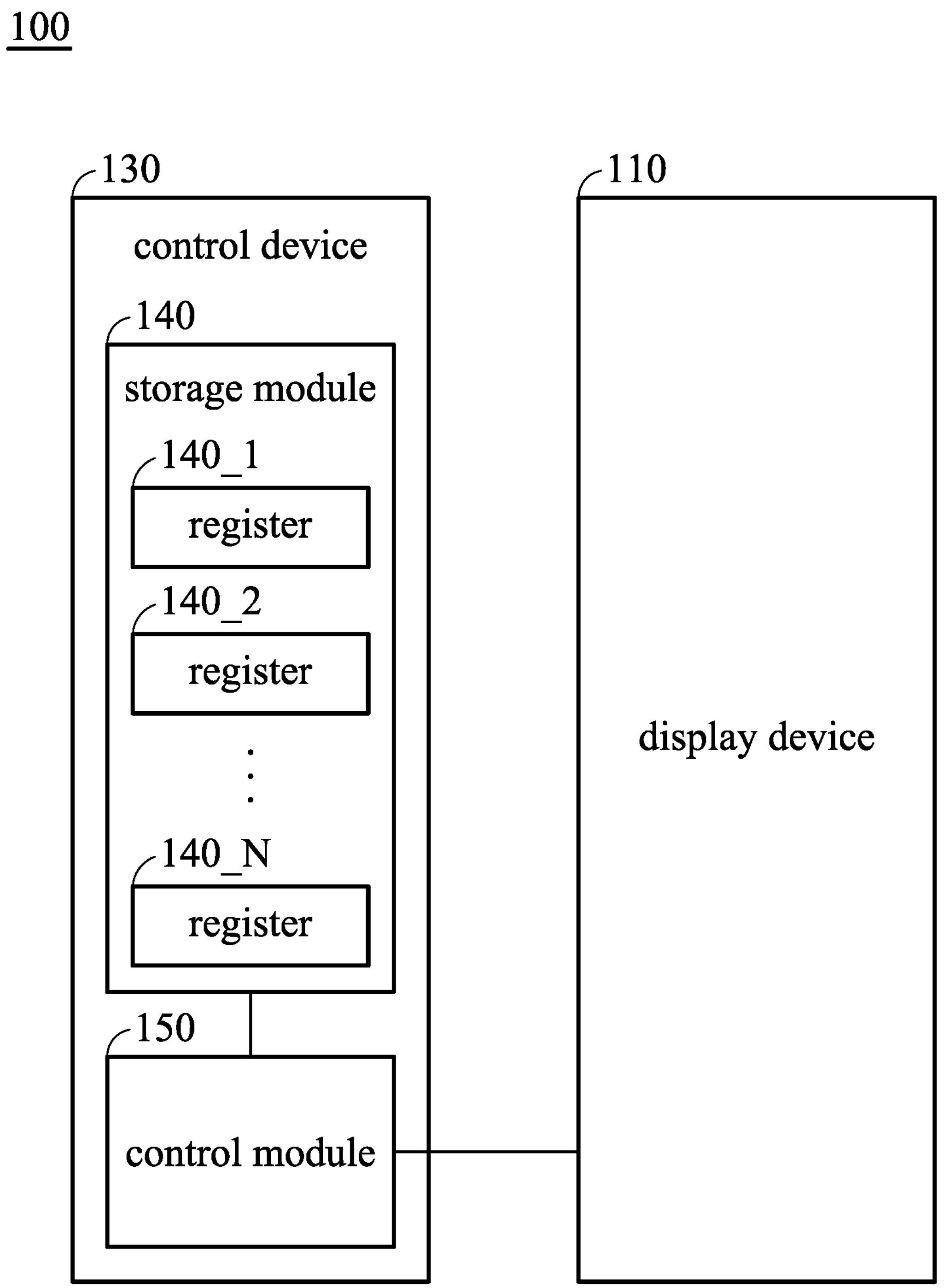
FIG. 1 is a schematic view of an electronic device according an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It should be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It should be acknowledged that although the terms "first", "second", "third", and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

In each of the following embodiments, the same reference number represents an element or component that is the same or similar.

FIG. 1 is a schematic view of an electronic device according an embodiment of the present invention. Please refer to FIG. 1. The electronic device 100 may include a display device 110 and a control device 130. In the embodiment, the display device 110 is, for example, a liquid crystal display (LCD), and the control device 130 is, for example, a micro control unit (MCU), a microprocessor, or a central processing unit (CPU), but the embodiment of the present invention is not limited thereto.

The control device 130 may be coupled to the display device 110. The control device 130 may include a storage module 140 and a control module 150. The storage module 140 may include a plurality of registers 141_1~141_N, wherein N is a positive integer greater than 1. In the embodiment, the storage module 140 is, for example, a static random access memory (SRAM), but the embodiment of the present invention is not limited thereto.

The control module 150 may be coupled to the storage module 140. The control module 150 may set the buffer width of the registers 141_1~141_N, the used number of registers 141_1~141_N and the occupied number that a horizontal line signal occupies the registers 141_1~141_N according to a horizontal resolution of the display device 110. In the embodiment, the above occupied number and the above used number may be the same or different. In addition, the above occupied number may change according to changes in the horizontal resolution. Furthermore, the buffer width of the registers is the same. Moreover, the control module 150 may further averagely assign the pixels of the horizontal line signal to the registers 141_1~141_N.

Figure 2:
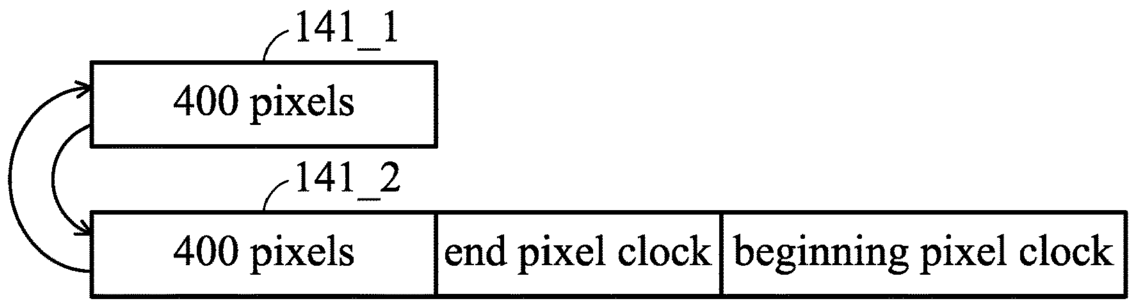
FIG. 2 is a schematic view of an operation of a register according an embodiment of the present invention.

For example, in some embodiments, it is assumed that the resolution of the display device 110 is 800*480, wherein the horizontal resolution is 800, and the number of horizontal lines is 480. The control module 150 may set the buffer width of the registers 141_1~141_N to 400, the used number of the registers 141_1~141_N to 2 (such as the register 141_1 and the register 141_2) and the occupied number that the horizontal line signal occupies the registers 141_1~141_N to 2 (i.e., 400*2=800) according to a horizontal resolution of 800, as shown in FIG. 2. In addition, in some embodiments, the control module 150 may also set the above used number to 4 (such as the register 141_1, the register 141_2, the register 141_3 and the register 141_4) and the occupied number to 2 (i.e., 400*2=800), i.e., the used number may be different from the occupied number.

Figure 3:
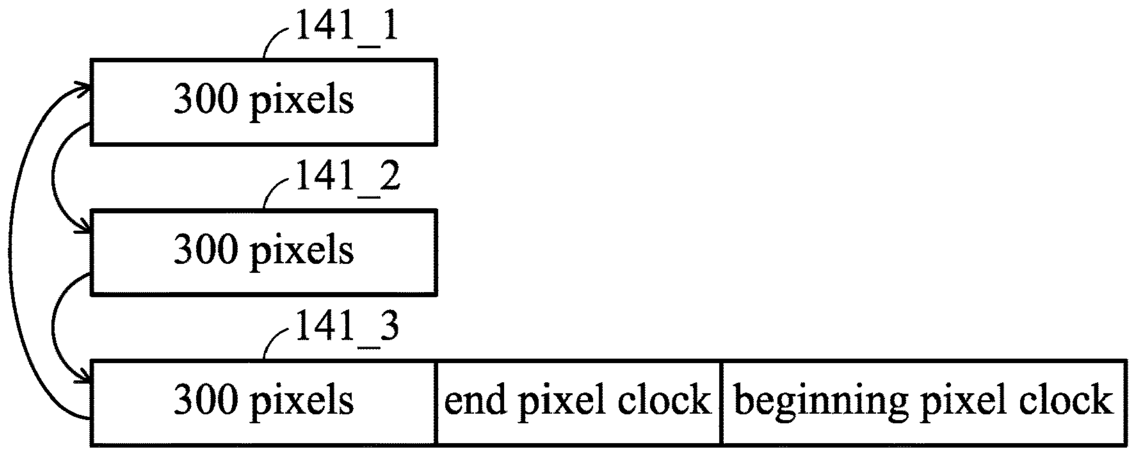
FIG. 3 is a schematic view of an operation of a register according an embodiment of the present invention.

In some embodiments, it is assumed that the resolution of the display device 110 is 900*600, wherein the horizontal resolution is 900, and the number of horizontal lines is 600. The control module 150 may set the buffer width of the registers 141_1~141_N to 300, the used number of the registers 141_1~141_N to 3 (such as the register 141_1, the register 141_2 and the register 141_3) and the occupied number that the horizontal line signal occupies the registers 141_1~141_N to 3 (i.e., 300*3=900) according to a horizontal resolution of 900, as shown in FIG. 3.

Figure 4:
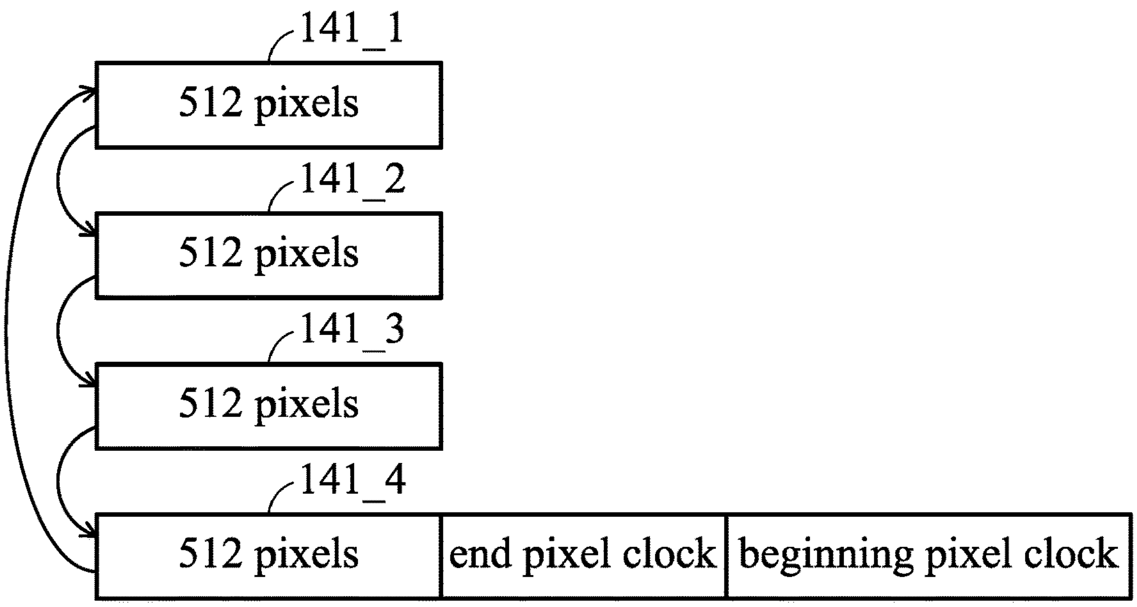
FIG. 4 is a schematic view of an operation of a register according an embodiment of the present invention.

In some embodiments, it is assumed that the resolution of the display device 110 is 2048*1024, wherein the horizontal resolution is 2048, and the number of horizontal lines is 1024. The control module 150 may set the buffer width of the registers 141_1~141_N to 512, the used number of the registers 141_1~141_N to 4 (such as the register 141_1, the register 141_2, the register 141_3 and the register 141_4) and the occupied number that the horizontal line signal occupies the registers 141_1~141_N to 4 (i.e., 512*4=2048) according to a horizontal resolution of 2048, as shown in FIG. 4.

Then, the control module 150 may receive the horizontal line signal, and assign a plurality of pixels of the horizontal line signal to the registers 141_1~141_N. For example, in some embodiments, it is assumed that the resolution of the display device 110 is 800*480, wherein each of the horizontal line signals may include 800 pixels, the control module 150 may averagely assign 800 pixels to the register 141_1 and the register 141_2, i.e., each of the register 141_1 and the register 141_2 includes 400 pixels, as shown in FIG. 2. In addition, the 800 pixels included in the register 141_1 and the register 141_2 correspond to, for example, a horizontal display period (HDP) THDP of a horizontal synchronization signal (HSYNC signal) HSYNC shown in FIG. 5, wherein the horizontal display period THDP indicates a period from the beginning to the end of effective pixels of the horizontal synchronization signal HSYNC.

Figure 5:
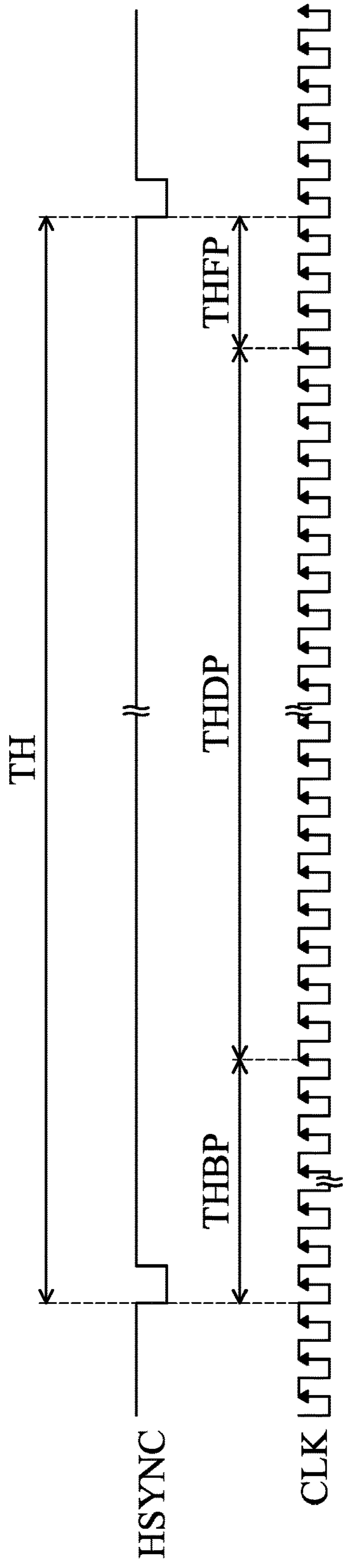
FIG. 5 is a schematic view of a corresponding relationship of a horizontal synchronization signal, an clock signal, a horizontal display period, a horizontal front porch and a horizontal back porch according another embodiment of the present invention.

In FIG. 5, the reference number "TH" indicates the horizontal synchronization period of the horizontal synchronization signal HSYNC (for example, including an enabling period (such as a low logic level) and a disabling period (such as a high logic level) of the horizontal synchronization signal HSYNC), the reference number "CLK" indicates the clock signal, the reference number "THDP" indicates horizontal display period of the horizontal synchronization signal HSYNC, the reference number "THFP" indicates that the horizontal front porch (HFP) of the horizontal synchronization signal HSYNC, and the reference number "THBP" indicates the horizontal back porch (HBP) of the horizontal synchronization signal.

In some embodiments, it is assumed that the resolution of the display device 110 is 900*600, wherein each of the horizontal line signals may include 900 pixels, the control module 150 may averagely assign 900 pixels to the register 141_1, the register 141_2 and the register 141_3, i.e., each of the register 141_1, the register 141_2 and the register 141_3 includes 300 pixels, as shown in FIG. 3. In addition, the 900 pixels included in the register 141_1, the register 141_2 and the register 141_3 correspond to, for example, the horizontal display period THDP of the horizontal synchronization signal HSYNC shown in FIG. 5.

In some embodiments, it is assumed that the resolution of the display device 110 is 2048*1024, wherein each of the horizontal line signals may include 2048 pixels, the control module 150 may averagely assign 2048 pixels to the register 141_1, the register 141_2, the register 141_3 and the register 141_4, i.e., each of the register 141_1, the register 141_2, the register 141_3 and the register 141_4 includes 512 pixels, as shown in 4. In addition, the 2048 pixels included in the register 141_1, the register 141_2, the register 141_3 and the register 141_4 correspond to, for example, the horizontal display period THDP of the horizontal synchronization signal HSYNC shown in FIG. 5.

Afterward, the control module 150 may sequentially output pixels of the horizontal line signal from the registers 141_1~141_N to the display device 110, so that the display device 110 correspondingly displays the pixels of the horizontal line signal. Therefore, the control device 130 and the electronic device 100 may have a structure with a variable number of registers, so as to avoid situations where the control device 130 may not support the display device 110 when the horizontal resolution of the display device 110 is greater than the maximum bandwidth of the register, and increase the convenience of use.

Furthermore, it is assumed that FIG. 2 is taken as an example for description. The control module 150 may output the pixels of the horizontal line signal from one of the registers 141_1~141_2. For example, the control module 150 may output 400 pixels of the register 141_1 from the register 141_1. Then, the control module 150 may determine whether the one of the registers 141_1~141_2 (i.e., the register 141_1) has completed a data output. That is, the control module 150 may determine whether the 400 pixels of the register 141_1 has completely output.

Afterward, when determining that the one of the registers 141_1~141_2 (i.e., the register 141_1) has completed the data output, the control module 150 accumulates the output number of the register, for example, adding "1" to the output number, i.e., "0+1=1". Then, the control module 150 may determine whether the output number matches the occupied number. That is, the control module 150 may determine whether the output number of "1" matches the occupied number of "2".

When determining that the output number of "1" does not match the occupied number of "2", the control module 150 may determine whether the output number matches the used number. That is, the control module 150 may determine whether the output number of "1" matches the used number of "2". When the control module 150 determines that the output number of "1" does not match a used number of "2", the control module 150 may select another one of the registers 141_1~141_N to serve as the one of the registers 141_1~141_N, and output the pixels of the horizontal line signal again. That is, the control module 150 may select the register 141_2, and output 400 of the register 141_2 from the register 141_2.

Then, the control module 150 may determine whether the one of the registers 141_1~141_2 (i.e., the register 141_2) has completed the data output. That is, the control module 150 may determine whether the 400 pixels of the register 141_2 has completed output.

Afterward, when determining that the one of the registers 141_1~141_2 (i.e., the register 141_2) has completed the data output, the control module 150 accumulates the output number of the register, for example, adding "1" to the output number, i.e., "1+1=2". Then, the control module 150 may determine whether the output number matches the occupied number. That is, the control module 150 may determine whether the output number of "2" matches the occupied number of "2".

When determining that the output number of "2" matches the occupied number of "2", it indicates that the control module 150 has output the last pixel of the horizontal line signal, the control module 150 may output an end pixel clock and a beginning pixel clock corresponding to the horizontal line signal. In the embodiment, the end pixel clock corresponds to, for example, the horizontal front porch THFP of the horizontal synchronization signal HSYNC shown in FIG. 5, wherein the horizontal front porch THFP indicates a period from the end of the effectively pixels of the horizontal synchronization signal HSYNC to the beginning of the next horizontal synchronization signal. The beginning pixel clock corresponds to, for example, the horizontal back porch THBP of the horizontal synchronization signal HSYNC shown in FIG. 5, wherein the horizontal back porch HSYNC indicates a period from the beginning of the next horizontal synchronization signal HSYNC to the beginning of the effective pixels.

Afterward, the control module 150 may determine whether output number matches the used number. That is, the control module 150 may determine whether the output number of "2" matches a used number of "2". When the control module 150 determines that the output number of "2" matches a used number of "2", the control module 150 resets the output number, for example, clearing the output number to "0".

In addition, following the above, when the control module 150 determines that the one of the registers 141_1~141_2 (i.e., the register 141_1) has completed the data output, the control module 150 accumulates the output number of the register (i.e., "0+1=1"), and the control module 150 may further clear the one of the registers 141_1~141_2 (i.e., the register 141_1), for example, clearing the 400 pixels of the horizontal line signal of the register 141_1.

Then, the control module 150 may receive the next horizontal line signal, and assign a part of a plurality of pixels of the next horizontal line signal to the one of the registers. That is, the control module 150 may assign the first 400 pixels of the next horizontal line signal to the register 141_1, so that the control module 150 may perform a subsequent output operation on the first 400 pixels of the next horizontal line signal.

Furthermore, following the above, when the control module 150 determines that the one of the registers 141_1~141_2 (i.e., the register 141_2) has completed the data output, the control module 150 accumulates the output number of the register (i.e., "1+1=2"), and the control module 150 may further clear the one of the registers

141_1~141_2 (i.e., the register 141_2), for example, clearing the 400 pixels of the horizontal line signal of the register 141_2.

Then, the control module 150 may receive the next horizontal line signal, and assign a part of a plurality of pixels of the next horizontal line signal to the one of the registers. That is, the control module 150 may assign the last 400 pixels of the next horizontal line signal to the register 141_2, so that the control module 150 may perform a subsequent output operation on the last 400 pixels of the next horizontal line signal.

In addition, the output operation of the pixels of the registers 141_1~141_3 as shown in FIG. 3 controlled by the control module 150 control and the output operation of the pixels of the registers 141_3~141_4 as shown in FIG. 4 controlled by the control module 150 are the same as or similar to the output operation of the pixels of the registers 141_1~141_2 as shown in FIG. 2 controlled by the control module 150. Accordingly, the output operation in FIG. 3 and the output operation in FIG. 4 may refer to the description of the above embodiment, and the description thereof is not repeated herein.

Figure 6:
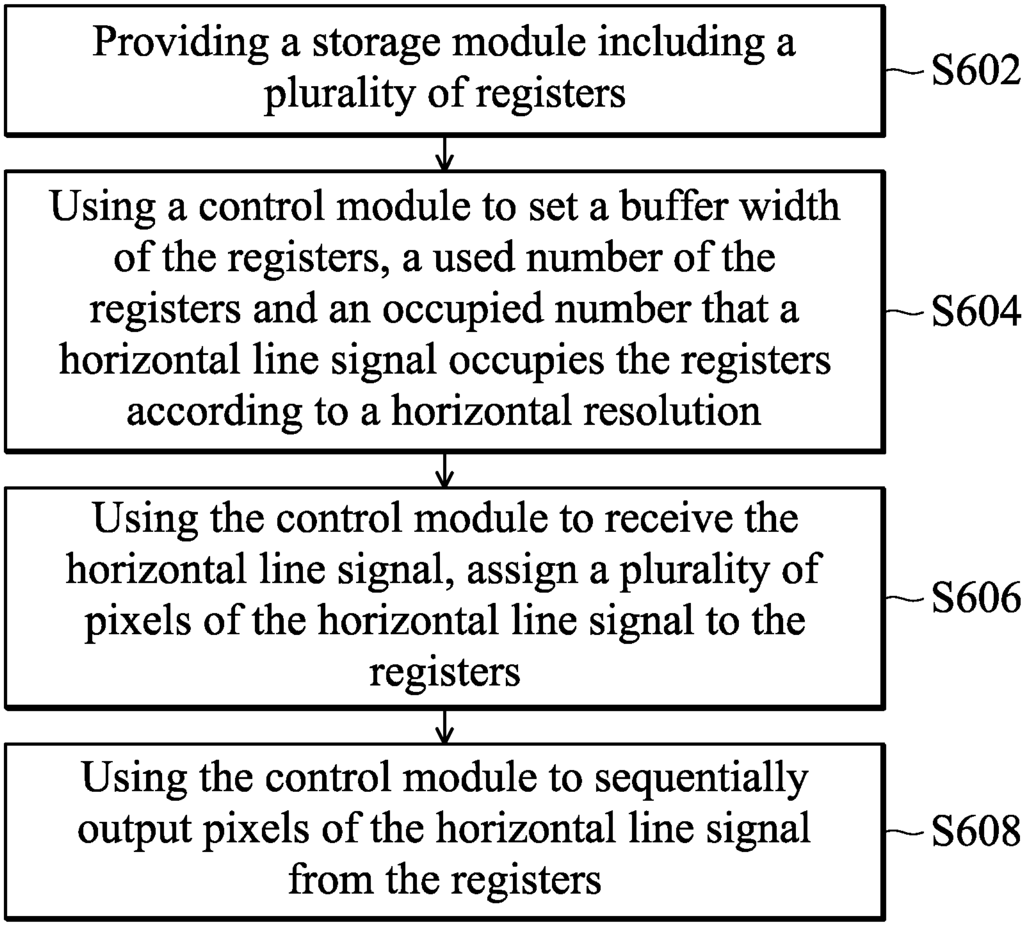
FIG. 6 is a flowchart of an operation method of a control device according an embodiment of the present invention.

FIG. 6 is a flowchart of an operation method of a control device according an embodiment of the present invention. In step S602, the method involves providing a storage module including a plurality of registers. In step S604, the method involves using a control module to set a buffer width of the registers, a used number of the registers and an occupied number that a horizontal line signal occupies the registers according to a horizontal resolution. In step S606, the method involves using the control module to receive the horizontal line signal, assign a plurality of pixels of the horizontal line signal to the registers. In step S608, the method involves using the control module to sequentially output pixels of the horizontal line signal from the registers.

In some embodiments, the occupied number and the used number may be the same or different. In some embodiments, the occupied number changes according to the change of the horizontal resolution. In some embodiments, the buffer width of the registers is the same. In some embodiments, the control module further averagely assigns the pixels of the horizontal line signal to the registers.

Figure 7:
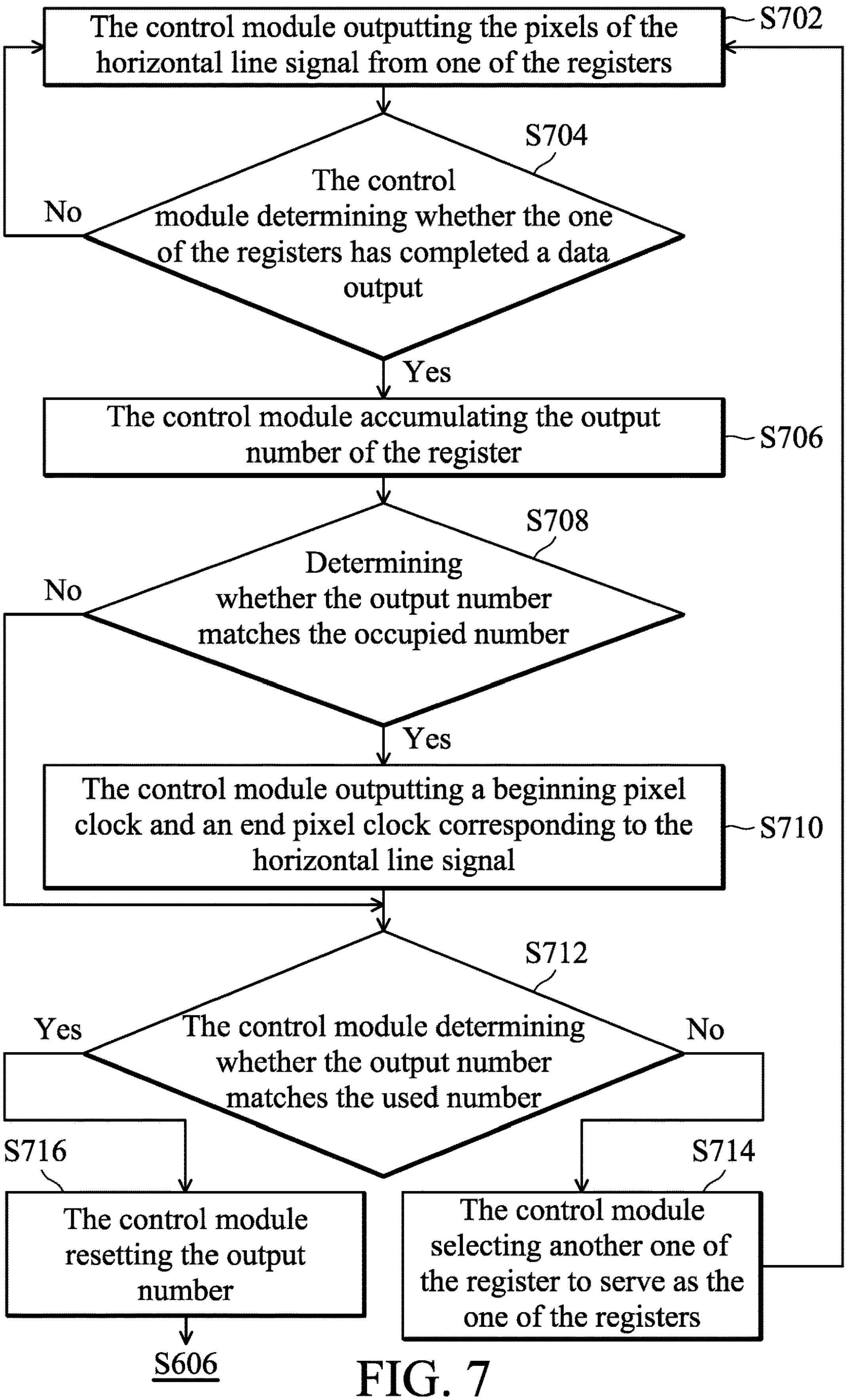
FIG. 7 is a detailed flowchart of step S608 in FIG. 6.

FIG. 7 is a detailed flowchart of step S608 in FIG. 6. In step S702, the method involves the control module outputting the pixels of the horizontal line signal from one of the registers. In step S704, the method involves the control module determining whether the one of the registers has completed a data output. When determining that the one of the registers has not completed the data output, the method returns to step S702, the control module 150 continuously outputs the pixels of the horizontal ling signal from the one of the registers until the control module 150 determines that the one of the registers has completed the data output.

When determining that the one of the registers has completed the data output, the method enters the step S706. In step S706, the method involves the control module accumulating the output number of the register. In step S708, the method involves determining whether the output number matches the occupied number. When determining that the output number matches the occupied number, the method enters step S710. In step S710, the method involves the control module outputting a beginning pixel clock and an end pixel clock corresponding to the horizontal line signal.

When determining that the output number does not match the occupied number, the method enters step S712. In step S712, the method involves the control module determining whether the output number matches the used number. When the control module determines that the output number does not match the used number, the method enters step S714. In step S714, the method involves the control module selecting another one of the register to serve as the one of the registers and returns to step S702. The control module outputs the pixels of the horizontal line signal from the one of the registers again. Then, steps S704~S714 may be performed until the control module determines that the output number matches the used number.

When the control module determines that the output number matches the used number, the method enters step S716. In step S716, the method involves the control module resetting the output number. Then, the operation method may return to step S606 in FIG. 6, to perform subsequent operations on the next horizontal line data.

Figure 8:
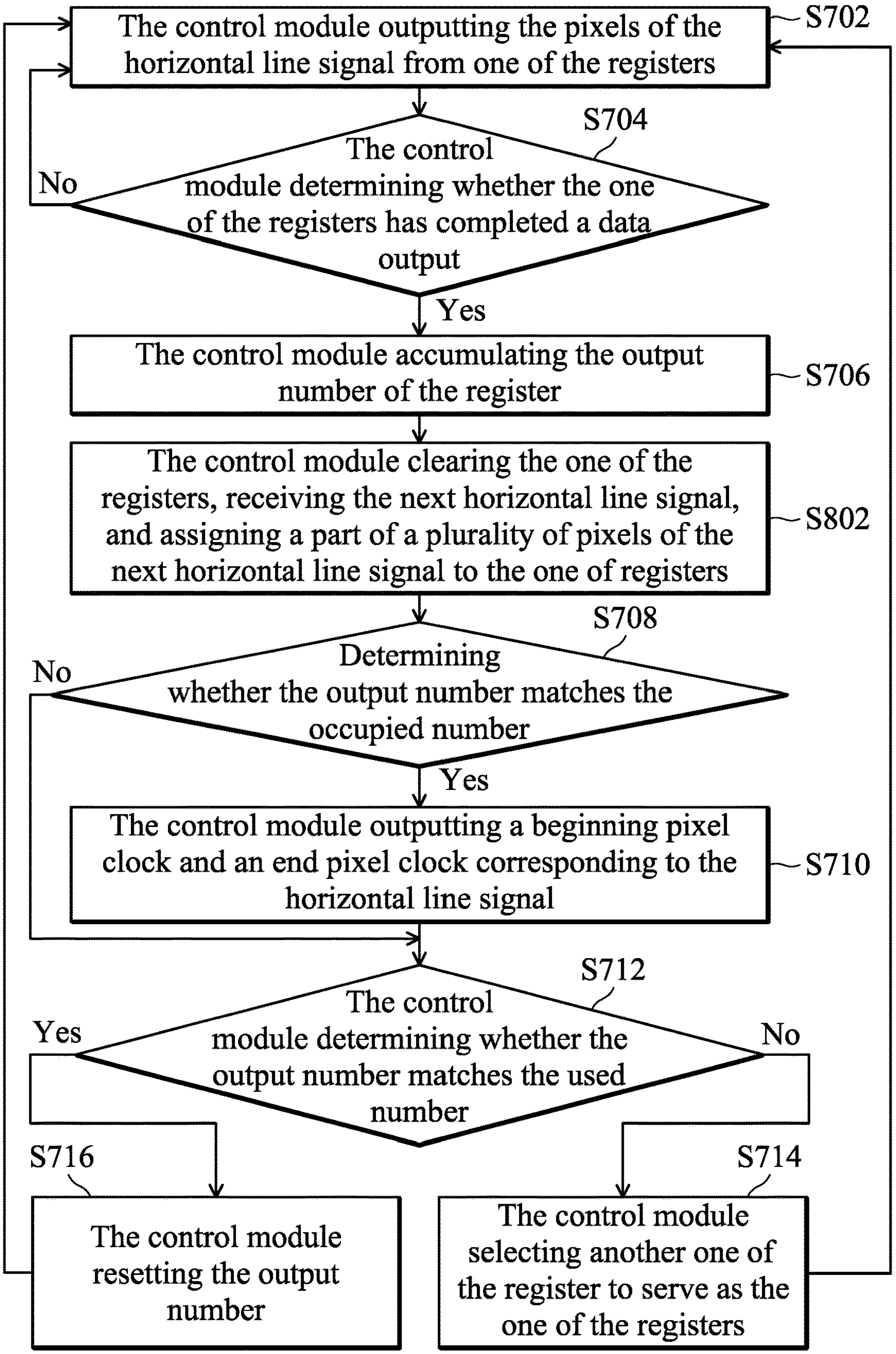
FIG. 8 is another detailed flowchart of step S608 in FIG. 6.

FIG. 8 is another detailed flowchart of step S608 in FIG. 6. In the embodiment, steps S702~S716 in FIG. 8 are the same as or similar to steps S702~S716 in FIG. 7. Accordingly, steps S702~S716 in FIG. 8 may refer to description of the embodiment of FIG. 7, and the description thereof is not repeated herein. In step S802, the method involves the control module clearing the one of the registers, receiving the next horizontal line signal, and assigning a part of a plurality of pixels of the next horizontal line signal to the one of registers.

After step S716 is performed, the operation method may return to step S702, to perform subsequent operations on the next horizontal line data. Therefore, the next horizontal signal data may be assigned to the corresponding register in advance, so as to avoid situations where the data may not transmitted in a timely manner to occur the error of the image display when the bandwidth of the system bus is limited, and increase the convenience of use.

In summary, according to the control device and the operation method thereof and the electronic device disclosed by the embodiment of the present invention, the control module sets the buffer width of the registers of the storage module, the used number of the registers and the occupied number that the horizontal line signal occupies the registers according to the horizontal resolution. The control module receives the horizontal line signal, and assigns the pixels of the horizontal line signal to the registers. In addition, when the control module determines that the current register has completed the data output, the control module clears the current register. The control module then receives the next horizontal line signal and assigns a part of the pixels of the next horizontal line signal to the current register. Therefore, the control device and the electronic device may have a structure in which the number of registers may vary, so as to avoid the situation in which the control device may not support the display device when the horizontal resolution of the display device is greater than the maximum bandwidth of the register, or the situation in which the data may not be transmitted in a timely manner leading to causing errors in the image display when the bandwidth of the system bus is limited, and increase the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control device, comprising:

a storage module, comprising a plurality of registers; and a control module, configured to set a buffer width of the registers, a used number of the registers and an occupied number that a horizontal line signal occupies the registers according to a horizontal resolution, receive the horizontal line signal, assign a plurality of pixels of the horizontal line signal to the registers, and sequentially output pixels of the horizontal line signal from the registers, wherein the control module further averagely assigns the pixels of the horizontal line signal to the registers.

2. The control device as claimed in claim 1, wherein the control module outputs the pixels of the horizontal line signal from one of the registers, the control module determines whether the one of the registers has completed a data output, when determining that the one of the registers has completed the data output, the control module accumulates an output number of the register and determines whether the output number matches the occupied number, when determining that the output number matches the occupied number, the control module outputs a beginning pixel clock and an end pixel clock corresponding to the horizontal line signal, when determining that the output number does not match the occupied number, the control module determines whether the output number matches the used number, when the control module determines that the output number does not match the used number, the control module selects another one of the registers to serve as the one of the registers and outputs the pixels of the horizontal line signal again, and when the control module determines that the output number matches the used number, the control module resets the output number.

3. The control device as claimed in claim 2, wherein when determining that the one of the registers has completed the data output, the control module further clears the one of the registers, receives a next horizontal line signal, and assigns a part of a plurality of pixels of the next horizontal line signal to the one of the registers.

4. The control device as claimed in claim 1, wherein the occupied number and the used number are the same or different.

5. The control device as claimed in claim 1, wherein the occupied number changes according to the change of the horizontal resolution.

6. The control device as claimed in claim 1, wherein the buffer width of the registers is the same.

7. An operation method of a control device, comprising:

providing a storage module comprising a plurality of registers; and using a control module to set a buffer width of the registers, a used number of the registers and an occupied number that a horizontal line signal occupies the registers according to a horizontal resolution;

using the control module to receive the horizontal line signal, assign a plurality of pixels of the horizontal line signal to the registers; and using the control module to sequentially output pixels of the horizontal line signal from the registers, wherein the control module further averagely assigns the pixels of the horizontal line signal to the registers.

8. The operation method of the control device as claimed in claim 7, wherein the step of sequentially outputting the pixels of the horizontal line signal from the registers comprises:

the control module outputting the pixels of the horizontal line signal from one of the registers;

the control module determining whether the one of the registers has completed a data output;

when determining that the one of the registers has completed the data output, the control module accumulating an output number of the register;

determining whether the output number matches the occupied number;

when determining that the output number matches the occupied number, the control module outputting a beginning pixel clock and an end pixel clock corresponding to the horizontal line signal;

when determining that the output number does not match the occupied number, the control module determining whether the output number matches the used number;

when the control module determines that the output number does not match the used number, the control module selecting another one of the registers to serve as the one of the registers, and returning to the step of the control module outputting the pixels of the horizontal line signal from one of the registers; and when the control module determines that the output number matches the used number, the control module resetting the output number.

9. The operation method of the control device as claimed in claim 8, wherein after step of when determining that the one of the registers has completed the data output, the operation method further comprises:

the control module clearing the one of the registers, receiving a next horizontal line signal, and assigning a part of a plurality of pixels of the next horizontal line signal to the one of the registers.

10. The operation method of the control device as claimed in claim 7, wherein the occupied number and the used number are the same or different.

11. The operation method of the control device as claimed in claim 7, wherein the occupied number changes according to the change of the horizontal resolution.

12. The operation method of the control device as claimed in claim 7, wherein the buffer width of the registers is the same.

13. An electronic device, comprising:

a display device; and a control device, coupled to the display device, wherein the control device comprises: a storage module, comprising a plurality of registers; and a control module, configured to set a buffer width of the registers, aused number of the registers and an occupied number that a horizontal line signal occupies the registers according to a horizontal resolution, receive the horizontal line signal, assign a plurality of pixels of the horizontal line signal to the registers, and sequentially output pixels of the horizon tal line signal from the registers, wherein the control module further averagely assigns the pixels of the horizontal line signal to the registers.

14. The electronic device as claimed in claim 13, wherein the control module outputs the pixels of the horizontal line signal from one of the registers, the control module determines whether the one of the registers has completed a data output, when determining that the one of the registers has completed the data output, the control module accumulates an output number of the register and determines whether the output number matches the occupied number, when determining that the output number matches the occupied number, the control module outputs a beginning pixel clock and an end pixel clock corresponding to the horizontal line signal, when determining that the output number does not match the occupied number, the control module determines whether the output number matches the used number, when the control module determines that the output number does not match the used number, the control module selects another one of the registers to serve as the one of the registers and outputs the pixels of the horizontal line signal again, and when the control module determines that the output number matches the used number, the control module resets the output number.

15. The electronic device as claimed in claim 14, wherein when determining that the one of the registers has completed the data output, the control module further clears the one of the registers, receives a next horizontal line signal, and assigns a part of a plurality of pixels of the next horizontal line signal to the one of the registers.

16. The electronic device as claimed in claim 13, wherein the occupied number and the used number are the same or different.

17. The electronic device as claimed in claim 13, wherein the occupied number changes according to the change of the horizontal resolution.

18. The electronic device as claimed in claim 13, wherein the buffer width of the registers is the same.

* * * * *